No. 722,202. PATENTED MAR. 10, 1903.
J. G. BRANCH.
HYDROCARBON BURNER.
APPLICATION FILED JAN. 6, 1902.
NO MODEL. 2 SHEETS—SHEET 1.

Witnesses:
C. L. Kesler
F. B. Keifer

Inventor
Joseph G. Branch
By James L. Norris
Atty

No. 722,202. PATENTED MAR. 10, 1903.
J. G. BRANCH.
HYDROCARBON BURNER.
APPLICATION FILED JAN. 6, 1902.
NO MODEL. 2 SHEETS—SHEET 2.

Witnesses:
C. D. Kesler

Inventor
Joseph G. Branch
By James L. Norris
Atty

UNITED STATES PATENT OFFICE.

JOSEPH G. BRANCH, OF ST. LOUIS, MISSOURI.

HYDROCARBON-BURNER.

SPECIFICATION forming part of Letters Patent No. 722,202, dated March 10, 1903.

Application filed January 6, 1902. Serial No. 88,623. (No model.)

*To all whom it may concern:*

Be it known that I, JOSEPH G. BRANCH, a citizen of the United States, residing at St. Louis, in the State of Missouri, have invented new and useful Improvements in Hydrocarbon-Burners, of which the following is a specification.

This invention relates to hydrocarbon-burners, and particularly to that class of such burners which are adapted to burn crude oil; and it has for its object to provide a burner of the type referred to by means of which the oil will be quickly volatilized and the heavy residuums, which are usually unconsumed, will be thoroughly burned out.

To these ends my invention consists in the features and in the construction, combination, and arrangement of parts hereinafter described, and particularly pointed out in the claims following the description, reference being had to the accompanying drawings, forming part of this specification, wherein—

Figure 1:
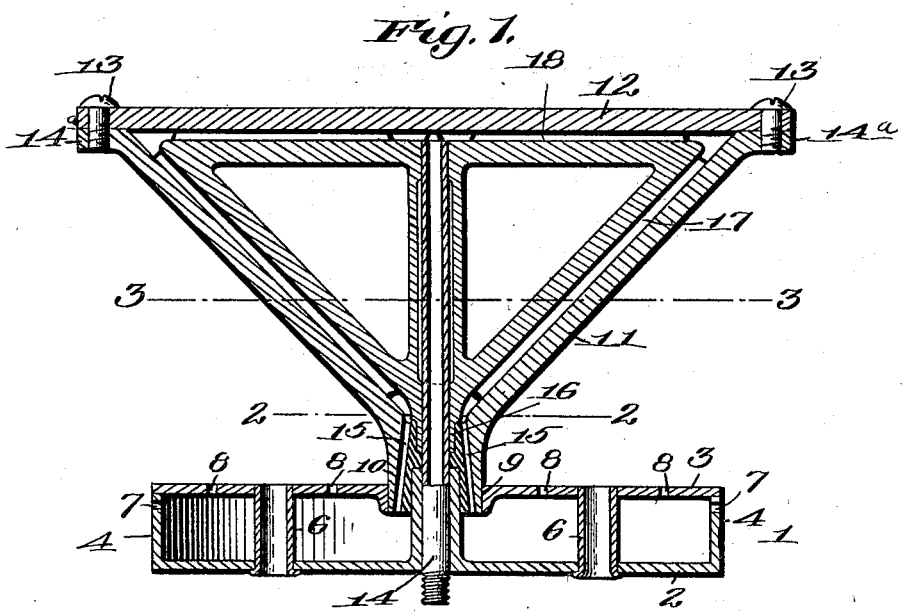
Figure 2:
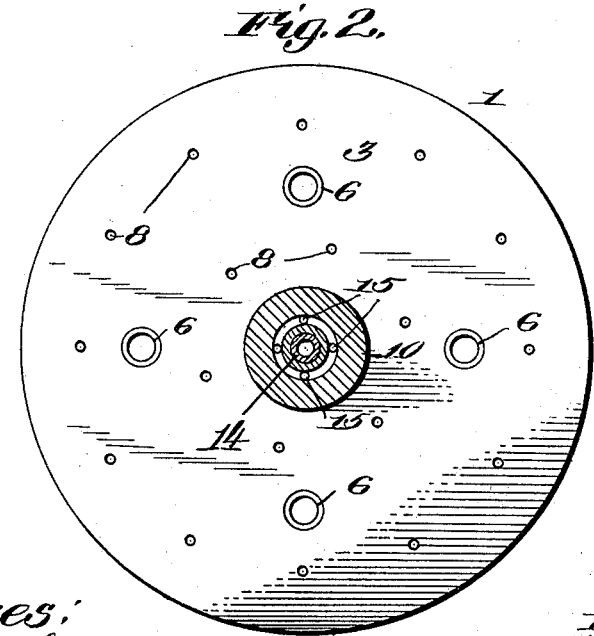
Figure 3:
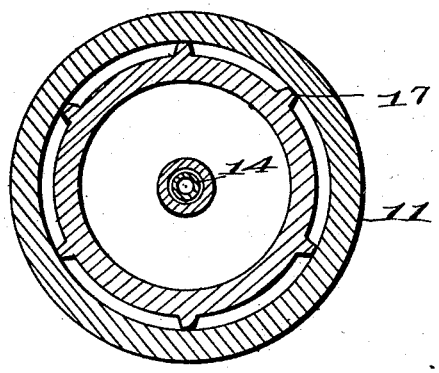
Figure 4:
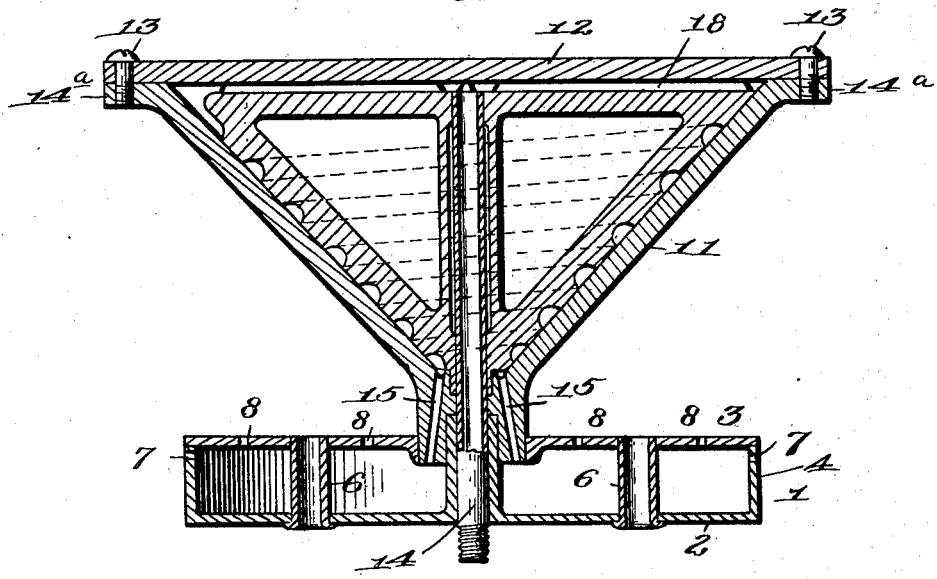

Figure 1 is a vertical central sectional view of my improved burner. Fig. 2 is a horizontal sectional view taken on the line 2 2 of Fig. 1 looking downward. Fig. 3 is a similar view taken on the line 3 3 of Fig. 1; and Fig. 4 is a view similar to Fig. 1, showing a slightly-modified construction.

Broadly stated, my invention comprises a pan and a vaporizing-chamber disposed above the pan and communicating at its lower end with the latter, the arrangement being such that the oil in its passage from the supply-reservoir to the point of ignition is caused to pass over a large heating-surface, whereby it is rapidly and thoroughly vaporized.

Referring to Figs. 1 to 3 of the drawings, the numeral 1 indicates a pan consisting of a circular or drum-shaped vessel comprising a flat bottom 2 and a similar top 3 and an annular encircling vertical wall 4. Passing transversely through the top and bottom of said pan are tubular air-ducts 6, which preferably consist of short pipe-sections secured in place in the bottom of the pan by spreading their lower ends in the manner shown. Formed in the vertical wall of the pan are air-inlets 7, and formed in the top of said pan is a plurality of jet-openings 8. The top of the pan is centrally apertured, as at 9, and fitted in said aperture is the neck 10 of a funnel-shaped shell or casing 11, that is closed at its upper end by circular plate 12, secured in place by bolts 13, which are passed through said plate and through an annular laterally-projecting flange 14ª, formed on the upper edge of said shell or casing. Disposed within said shell or casing is a similarly-shaped core consisting of a hollow conical shell the exterior dimensions of which are slightly less than the interior dimensions of the outer shell or casing, whereby a small or confined space is caused to intervene between the top and sides of the core and its surrounding shell or casing. A pipe 14 is fitted centrally in said core and at one end is connected with any suitable means for supplying oil to the burner and at its upper end communicates with the space between the top of the core and the cover of the surrounding shell or casing.

The operation of my improved burner will be readily understood. The oil is supplied to the burner through the central pipe before referred to and from this spreads over the top of the core and down between the inclined face of the latter and the inner surface of the surrounding shell or casing and from thence passes into the pan through the ducts 15, and the gas escapes through the jet-openings 8. In practice the jet-openings are made approximately about one-fourth of an inch in diameter, which is sufficient to allow a match, or preferably a piece of lighted cotton wicking, to be inserted through the jet-openings to start the burner. It is preferable, however, to lay cotton wicking on top of the pan and allow it to generate heat sufficient to vaporize the oil, which passes through the burner into the pan and burns through the jet-openings in the latter. The flames are directed against the exterior of the shell or casing and highly heat said outer casing and its inclosed core. The oil in its passage over the top of the core and down the sides of the latter is subjected to a high temperature and is thereby rapidly and thoroughly atomized, so that when it issues from the jet-openings it is in the best condition for thorough combustion. The heavy residuums that usually go to waste and operate to clog up the burners are in my improved burner thoroughly consumed in the pan, and the combustion of the crude oil is enhanced by providing the air-inlet tubes before described, so that an abundant supply of oxygen is furnished the gas.

In Fig. 4 I have illustrated a slightly-modified construction of my improved burner. Instead of disposing the core in its inclosing casing in such manner as to form a small space between said core and its casing the core may be snugly fitted within its casing, and when this is done a spiral groove is formed on the periphery of the core and extends from the upper edge of said core to the lower end thereof, where its lowermost convolution communicates with the ducts 15. The operation of this modified form of device is precisely the same as that before described. The oil passes centrally through the core-piece, over the top of the latter, flows spirally through the groove, and in its passage through the latter is subjected to a high degree of heat, whereby when the oil rises in the pan it is in the form of a highly-heated gas and as it escapes from the jet-openings is in the best possible condition for thorough combustion.

The top 3 of the pan in both forms of the device shown is made removable—that is to say, it can be raised up on the neck of the outer cone—so that access may be had to the interior of the pan for cleaning the same. When starting the burner by inserting a lighted match into the pan to ignite the oil therein, the lighted match may be inserted through one of the openings 8, as before described, or, if preferred, the match may be inserted through one of the lateral openings 7, which in the initial part of the operation serve to admit oxygen to the pan to permit the oil to burn freely, and after the burner is in full operation the vapor will issue from the openings 7 and having been ignited will burn in the form of jets and assist in vaporizing the oil flowing through the cone.

In the arrangement shown in Fig. 1 the inner cone is provided with a shoulder 16, which fits in the outer cone at its base, as shown in said figure. The two cones are held the requisite distance apart by ribs 17, which run from the top to the bottom of the inner cone, and said inner cone is provided on its top with ribs 18, which radiate from the central opening of the pipe 14. These ribs operate to prevent the gas pressing the top of the inner cone up against the cover-plate 12.

In the modification shown in Fig. 4 it is only necessary to provide the ribs on the top of the inner cone, as said inner cone fits snugly within the outer cone.

Having described my invention, what I claim is—

1. In a hydrocarbon-burner, the combination with a closed pan, of a funnel-shaped casing fitted at its lower end centrally in the top of the pan, a similarly-shaped but smaller core arranged concentrically within said casing, an oil-feed pipe extending centrally through said pan, casing and core and communicating at its upper end with the space between the core and casing, and ducts in the lower contracted end of the funnel-shaped casing which communicate with the space between the casing and its core and with the interior of the pan, the top of the pan being provided with jet-openings, substantially as described.

2. In a hydrocarbon-burner, the combination with a closed pan, of a funnel-shaped casing fitted at its lower end centrally in the top of the pan, a similarly-shaped but smaller core arranged concentrically within said casing, an oil-feed pipe extending centrally through the pan, casing and core and communicating at its upper end with the space between the core and casing, ducts in the lower contracted end of the casing which communicate with the space between the casing and its core and the interior of the pan, and vertical air-ducts extending entirely through the pan, substantially as described.

3. In a hydrocarbon-burner, the combination with a drum-shaped casing, provided with air-inlets on its sides and jet-openings on its top, and with air-ducts extending transversely therethrough, of a conical casing fitted centrally in the top of said pan, and communicating with the interior thereof, a conical core fitted concentrically within said casing, and means for supplying oil to the space between the upper side of said core and the top of said casing, substantially as described.

4. In a hydrocarbon-burner, the combination with a drum-shaped pan having a removable top, of a funnel-shaped casing fitted centrally in the top and communicating with the interior of said pan, a conical core fitted concentrically within said casing, and means for supplying oil to the space between the top of the core and the casing, the said removable top of the pan being provided with jet-openings, substantially as described.

5. In a hydrocarbon-burner, the combination with a drum-shaped pan having a removable top, of a funnel-shaped casing fitted centrally in the top and connected with the interior of said pan, a conical core fitted concentrically within said casing and provided on its sides and bottom with ribs for holding said core out of contact with said casing and means for supplying oil to the space between the top of the core and the casing, said top of the pan being provided with jet-openings, substantially as described.

In testimony whereof I have hereunto set my hand in presence of two subscribing witnesses.

JOSEPH G. BRANCH.

Witnesses:
LEONIDAS H. LAIDLEY,
HARRY C. WAKEFIELD.